United States Patent [19]

Somerville et al.

[11] Patent Number: 4,634,533

[45] Date of Patent: Jan. 6, 1987

[54] METHOD OF CONVERTING BRINES TO USEFUL PRODUCTS

[76] Inventors: Robert L. Somerville; Samuel F. Sweat; John L. Sullivan, all of c/o Brine Extractions Systems Technology Co., 6100 Channingway Blvd., Ste. 701, Columbus, Ohio 43232

[21] Appl. No.: 727,804

[22] Filed: Apr. 26, 1985

[51] Int. Cl.[4] ............................................. C02F 1/52
[52] U.S. Cl. ...................................... 210/722; 71/43; 210/724; 210/726; 210/737; 210/912; 210/915; 423/169; 423/311
[58] Field of Search ................ 71/33, 42, 43; 210/710, 210/712, 721, 722, 724, 726, 727, 737, 759, 760, 776, 912, 914, 915; 423/158, 169, 311

[56] References Cited

U.S. PATENT DOCUMENTS

| | | | |
|---|---|---|---|
| 3,135,595 | 6/1964 | Williams | 71/25 |
| 3,163,599 | 12/1964 | Salutsky et al. | 71/33 |
| 3,262,865 | 7/1966 | Waters | 210/724 |
| 3,374,081 | 3/1968 | Miller | 71/11 |
| 3,617,539 | 11/1971 | Grutsch et al. | 210/776 |
| 4,007,030 | 2/1977 | Schroeder et al. | 71/40 |
| 4,015,971 | 4/1977 | Barannik et al. | 71/31 |
| 4,016,075 | 4/1977 | Wilkins | 210/712 |
| 4,069,033 | 1/1978 | Baldassari | 71/25 |
| 4,117,089 | 9/1978 | Fujita et al. | 423/306 |
| 4,166,839 | 9/1979 | Skauli et al. | 71/43 |
| 4,176,022 | 11/1979 | Darlington | 423/158 |
| 4,176,057 | 11/1979 | Wheatley et al. | 210/188 |
| 4,188,291 | 2/1980 | Anderson | 203/10 |
| 4,405,463 | 9/1983 | Jost et al. | 210/722 |
| 4,465,598 | 8/1984 | Darlington et al. | 210/912 |
| 4,482,459 | 11/1984 | Shiver | 210/639 |

FOREIGN PATENT DOCUMENTS

| | | | |
|---|---|---|---|
| 473672 | 9/1975 | U.S.S.R. | 423/158 |
| 596562 | 2/1978 | U.S.S.R. | |
| 732211 | 5/1980 | U.S.S.R. | 210/722 |

Primary Examiner—Peter Hruskoci
Attorney, Agent, or Firm—Killworth, Gottman, Hagan & Schaeff

[57] ABSTRACT

A process is provided for the recovery of one or more useful products including fertilizer, animal feed supplements, iron oxide, magnesia, salt, purified brine, and purified water from brines. The source of the brines can be oil and gas field wastes, seawater or effluent from a seawater desalination plant, or other inland brine sources. Iron and magnesium are initially precipitated from the brine. Then phosphoric acid is added to the brine followed by an alkaline agent to produce precipitates useful as fertilizer and animal feed supplements. The remaining salt in the brine may then be removed and recovered along with purified water.

14 Claims, 1 Drawing Figure

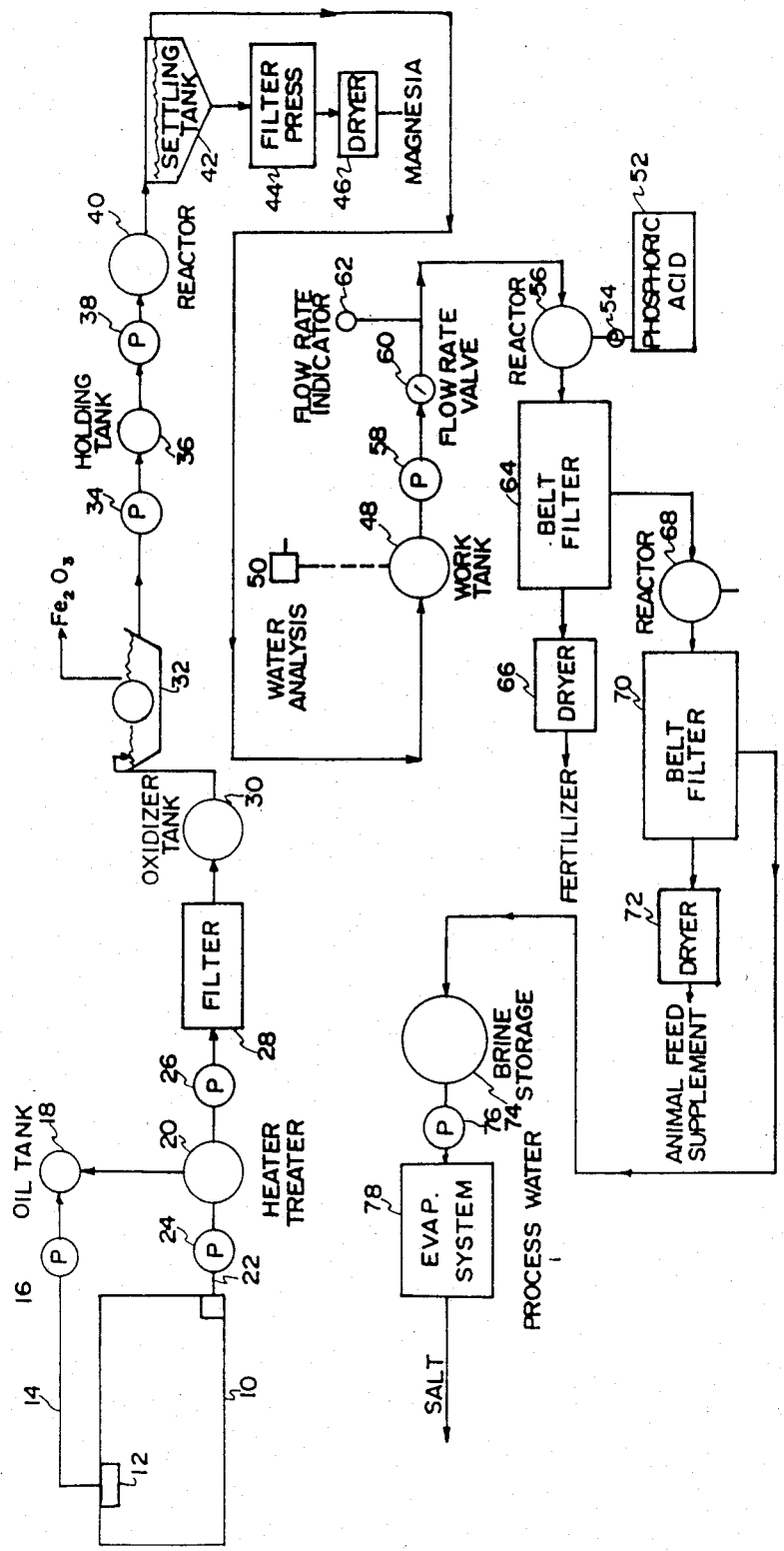

METHOD OF CONVERTING BRINES TO USEFUL PRODUCTS

BACKGROUND OF THE INVENTION

This invention relates to a process for converting brines into useful products, and more particularly to converting saline waters such as oil and gas field brine wastes, seawater or effluent from a seawater desalination plant, or other inland saline waters into animal feed supplements, fertilizer, salt, purified brine and purfied water.

Oil and gas field operations generate waste products in the production and handling of crude oil and natural gas. These waste products include drilling mud pit waters and oil and gas field brines. The quantities of brines produced in oil and gas fields can be substantial, with brine fractions accounting for from 4 to 96 percent of the total liquid volume produced. Brines from other inland or seawater sources also present disposal problems.

Various method of disposal of these brines have been attempted including solar evaporation, thermal evaporation, controlled release of brines into surface water, and injection of brines into subterranean formations. However, in areas of high annual rainfall and/or high relative humidity, such as much of the midwestern and eastern portions of the United States, solar evaporation becomes impractical. Moreover, with increasing state and federal regulatory pressures, diversion of large volumes of brine into surface waters is not an environmentally acceptable solution.

While evaporation as a means of recovering fresh water from these saline sources has been attempted, the presence in such brines of a large proportion of divalent metal chlorides such as calcium and magnesium chloride have greatly complicated recovery efforts. These metal chlorides are highly corrosive to process equipment surfaces and deposit hard to remove mineral scales. This scale deposition becomes an even greater problem when the brines are heated.

Presently, brine treatment using dissolved air flotation methods to remove suspended oil, followed by deep well injection of the brine is regarded by the United States Environmental Protection Agency as the best practicable technology for disposal. However, deep well injectin is expensive, difficult to design to a given level of capacity, and requires careful conditioning of the brine prior to injection. Also, deep well injection of brines may present a contamination hazard to fresh water aquifers. Economies of scale favor deep well injection systems having capacities of millions of gallons of brines per month. However, in oil and gas fields in the midwestern and eastern United States where less brine wastes are produced than in western oil fields, and where the oil and gas fields themselves are smaller, deep well injection may not, in many instances, be an economically feasible disposal alternative.

Some attempts have been made in the past to separate useful byproducts from brines or other industrial waste waters. For example, Miller, U.S. Pat. No. 3,374,081, teaches a method of precipitating minerals from saline waters using lignin compounds, proteinaceous compounds, and tannins. The saline waters are initially concentrated by evaporation and the resultant salt precipitate removed. Then an organic precipitating agent such as a lignin or tannin is added to form an organic fertilizer containing other inorganic minerals.

Baldassari, U.S. Pat. No. 4,069,033, teaches the extraction of fertilizer salts and organic substances from a variety of industrial waste waters including sugar mill, distillery, and fermentation wastes. Baldassari teaches the use of strong acids or bases to form precipitates from such waste waters which precipitates are taught to be useful as fertilizers. However, neither of these particular procedures is believed to have gained widespread use.

Accordingly, the need exists for a cost effective and environmentally acceptable method for the disposal of oil and gas field waste brines and other saline water sources.

SUMMARY OF THE INVENTION

The present invention provides for the recovery of valuable products such as animal feed supplements, fertilizers, magnesia, iron oxide, salt, purified brine, and purified water from saline water sources such as oil and gas field waste brines and seawater. These products are useful materials having economic value.

According to one aspect of the present invention, a method is provided in which an oxidizing agent is initially added to the brine to remove iron from the brine as a precipitate. An alkaline agent is then added to the brine to adjust the pH of the brine to the range of 7.5 to 9.0 to cause magnesium ions present in the brine to precipitate and be removed. Sufficiently phosphoric acid is then added to the brine to provide a substantially stoicheometric ratio of phosphoric acid to divalent cations, principally calcium, in the brine. An alkaline agent is then added to the brine to form calcium phosphate precipitates which are useful as an animal feed supplements or fertilizers.

Optionally, the remaining dissolved salts in the brine solution, which is now substantially free of divalent metal compounds, can be readily separated and recovered by the use of a vapor compression evaporator crystallizer of multiple effect evaporator crystallizer. The recovered salt is principally sodium chloride. This salt is a highly purified product which is useful for practically all commercial purposes. The water which is recovered from the separation process is substantially free of dissolved solids and deleterious metal cations and can be disposed of directly or can be sold as purified water to industrial and commercial concerns.

Accordingly, it is an object of the present invention to provide a process for the recovery of one or more useful products incuding animal feed supplements, fertilizer, iron oxides, magnesia, salt, purified brine, and purified water from brines. This and other objects and advantages of the invention will be apparent from the following detailed desription, the accompanying drawing, and the appended claims.

BRIEF DESCRIPTION OF THE DRAWINGS

The single drawing FIGURE illustrates, in the form of a schematic diagram, the process of the present invention.

DESCRIPTION OF THE PREFERRED EMBODIMENTS

In accordance with the practice of the present invention, and with reference to the drawing FIGURE, a saline water source such as an oil field waste brine, seawater, or other inland saline water is initially stored in a large pit, tank, or storage chamber 10. The pit, tank, or storage chamber 10 is preferably lined or otherwise formed to be substantially water tight. If an oil or gas field waste brine is used as the saline water source, it may be necessary to remove traces of oil which are present in the brine. Typically, there is approximately one-half pint of oil per barrel of brine as received from oil field operations. This oil removal is accomplished through the use of a surface skimmer 12 which collects oil floating on the surface of the brine and pumps it via line 14 and pump 16 to an oil storage tank 18.

Additionally, further oil may be removed from the brine in a separation device such as heater treater 20 after removal of the brine from pit 10 via line 22 and pump 24. Heater treater 20 typically comprises a holding tank or the like which provides undisturbed residence time for separation of the oil and brine. Heat is supplied to heater treater 20 to accelerate the separation process, and, optionally, chemicals may be added to heater treater 20 which further enhance separation.

The brine is then filtered to remove suspended solids by pumping it via line 26 through filter 28. Filter 28 may be any suitable filtration device and is preferably a vacuum drum or plate and frame type filter. Such filtration devices are commercially available from a number of sources.

After filtration, the brine is sent to tank 30 where an oxidizing agent is added to the brine to convert any ferrous ions present in the brine to the ferric state. Suitable oxidizing agents include hydrogen peroxide, or ozone. Preferably, this oxidizing reaction is carried out at an acidic pH. Depending on the pH of the brine entering tank 30, the pH of the solution may be adjusted by the addition of an acid or base to bring it within the optimum range. An additional advantage of the oxidation step of the process is that it will destroy any traces of organic materials which may be present in the brine.

After oxidization, an alkaline agent is added to tank 30 to raise the pH of the brine to about 7.0 and cause all iron ions present therein to precipitate as iron oxides. The brine is then sent to a suitable filter 32 where the iron oxide precipitate is removed. The brine is then pumped via pump 34 to a further holding tank 36.

At this point in the process, magnesium is removed from the brine. The presence of magnesium ions in the brine at a later point in the process will result in the production of products having a lower ecomonic value. Additionally, purified magnesium compounds have economic value. Magnesium is typically present in the brine as magnesium chloride which can be reacted with an alkaline material to form magnesium hydroxide as illustrated by equations I and II below:

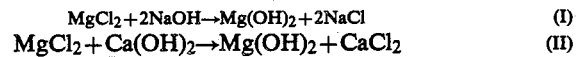

$$MgCl_2 + 2NaOH \rightarrow Mg(OH)_2 + 2NaCl \quad \text{(I)}$$
$$MgCl_2 + Ca(OH)_2 \rightarrow Mg(OH)_2 + CaCl_2 \quad \text{(II)}$$

To remove magnesium, the brine is pumped via pump 38 to reactor 40. A sufficient amount of an alkaline agent to adjust the pH of the brine to the range of 7.5 to 9.0 is added to reactor 40. A pH meter (not shown) may be used to monitor the pH of the brine solution. After reaction, the brine may be sent to a thickener or settling tank 42 where the precipitated magnesium hydroxide would be concentrated. The precipitate is then filtered in filter 44, washed free of soluble salts, and either dried or calcined in dryer 46. The magnesia product is useful in making refractory bricks and magnesium metal as well as an additive for cosmetics, pharmaceuticals, and insulation.

As shown by equations I and II above, the alkaline agent may be either calcium hydroxide (hydrated lime), hydrated lime from burned dolomite, or sodium hydroxide. If burned dolomite is used, the magnesium content of the dolomite is recovered with the magnesium hydroxide precipitate. Sodium and/or calcium cations, which replace the magnesium ions in solution, are recovered later in the process as explained below.

The clear brine solution from settling tank or thickener 42 and/or filtrated from filter 44 is then sent to a work tank 48 which serves as a holding tank for the brine prior to reaction with phosphoric acid. The brine in work tank 48 may be periodically sampled and analyzed at analysis station 50 to determine the concentration of divalent calcium and other metal cations contained therein. This analysis is then utilized to meter the proper amount of phosphoric acid into the brine from phosphoric acid source 52 and metering pump 54. Preferably, the amount of phosphoric acid added is in a substantially stoichiometric ratio to the concentration of divalent metal cations, principally calcium, in the brine, resulting in a chemical reaction which causes substantially all of the divalent metal cations in the brine to be removed as a precipitate as more fully explained below. The addition of a substantially stoichiometric amount of phosphoric acid to the brine will lower the pH of the brine to less than 2.0. The flow rate of the brine into reactor 56 may be controlled by pump 58 and flow rate valve 60, and is monitored periodically by flow rate indicator 62.

A preferred source of phosphoric acid is agricultural grade phosphoric acid containing 75% orthophosphoric acid (54% when reported as phosphorous pentoxide). The brine and phosphoric acid are thoroughly agitated in reactor 56 to form a reaction mixture. Any suitable agitation device may be utilized including a stirred tank reactor or motionless mixing device.

To the reaction mixture, an alkaline agent is added to adjust the pH of the mixture to the range of 1.8 to 2.9. A metering pump and pH meter may be used to control the addition of alkaline agent. As the alkaline agent, either soda ash ($Na_2CO_3$), caustic soda (NaOH), potassium hydroxide, or potassium carbonate are preferred. The addition of an alkaline agent causes the precipitation of a mixture of fertilizer salts including principally dicalcium phosphate ($CaHPO_4 \cdot 2H_2O$). Additionally, most trace impurities in the brine such as strontium, iron, aluminum, flourine, and the like, will also be precipitated at this stage as complex mineral salts. This is because other ions will react with the phosphoric acid at pH's lower than that which calcium will react. This first stage of precipitation may not be necessary where impurity levels in the brine are sufficiently low.

Such precipitated compounds are separated from the brine solution by filtration, such as by belt filter 64. The precipitate is then dried in dryer 66. The dried precipitate is a citrate soluble fertilizer material having an approximate NPK analysis of 0-40-0.

The reaction mixture is then taken to a further agitated reactor 68 where more alkaline reagent is added to bring the pH of the reaction mixture to the range of 3.5 to 6.0. This causes essentially complete precipitation of all remaining dicalcium phosphate from the brine solution. Because of the preliminary precipitation step, the dicalcium phosphate precipitated at this stage of the process is quite pure as is useful as a premium grade animal feed supplement. The precipitated dicalcium phosphate is removed via belt filter 70 and then dried in dryer 72.

By controlling the pH of the brine solution after the addition of phosphoric acid, the ratio of calcium phosphates precipitated at each stage (reactors 56 and 68) may be controlled. If impurity levels are sufficient to warrant a two-stage precipitation then, preferably, a minimum amount of calcium phosphates is initally precipitated with the major portion being precipitated in reactor 68. In practice, this ratio is about 10–30% in the first stage and 70–90% in the second stage.

Additionally, the total amount of calcium phosphates produced by the process may be modified somewhat by the selection of alkaline agents at various stages of the process. The use of calcium hydroxide as an alkaline agent at earlier stages of the recovery process will place more calcium cations into solution for later precipitation. In this manner, the process of the present invention is flexible to market conditions for the need for more or less calcium phosphate products. Additionally, while the preferred process has been described above, it is within the scope of the invention to add phosphoric acid and alkaline agent to the brine to precipitate calcium phosphates in a single stage procedure or a procedure with two or more successive states.

The remaining brine is now substantially free of all divalent metal cations. The brine is pumped from storage tank 74 by pump 76 to an optional evaporation system 78. It may be desirable to adjust the pH of the brine in storage tank 75 to minimize corrosion problems in the evaporation equipment, and this may be accomplished by further addition of an alkaline agent such as sodium hydroxide to the brine. The brine itself is a useful product which can be used as a raw material for chlor-alkali plants. Optionally, it may be evaporated to recover crystallized salt.

Evaporation system 78 is preferably a forced circulation evaporator-crystallizer with vapor recompression. Such systems are commercially available. The evaporation system provides both a pure crystallized salt and purified process water.

The recovered salt is principally sodium chloride. Potassium, lithium, and any remaining calcium and magnesium cations are concentrated in the bitterns produced by the evaporation process and may be recycled back to the beginning of the process. The recovered salt is a highly purified product which can be marketed for practically all commercial uses.

The recovered water from evaporation system 78 is itself highly pure and contains less than 1 mg/l of total solids and an absence of deleterious anions and divalent metal cations. The water can be used as process and wash water in the process of the present invention, can be discharged directly to rivers, lakes, and streams with no environmental harm, or alternatively may be sold to industries having large purified water requirements.

While the methods herein described constitute preferred embodiments of this invention, it is to be understood that the invention is not limited to these precise methods and that changes may be made without departing from the scope of the invention, which is defined in the appended claims.

What is claimed is:

1. A method for recovering useful products from a brine containing divalent ferrous, calcium, and magnesium ions comprising the steps of:

(a) adding a sufficient amount of oxidizing agent to said brine to convert said ferrous ions to ferric ions and form an iron oxide precipitate and removing said precipitate from said brine;

(b) adding a first alkaline agent comprising sodium hydroxide to said brine to adjust the pH of said brine to the range of 7.0 to 9.0 and removing a magnesium hydroxide precipitate from said brine;

(c) adding phosphoric acid in a substantially stoichiometric ratio to the divalent cations in said brine followed by the addition of a second alkaline agent comprising sodium hydroxide to form a calcium phosphate precipitate useful as an animal feed supplement or fertilizer; and (d) separating said calcium phosphate precipitate from said brine.

2. The process of claim 1 in which the addition of phosphoric acid in step (c) lowers the pH of said brine to the range of 0.5 to 1.5.

3. The process of claim 1 in which the precipitation in step (c) is carried out in two or more successive stages with the stepwise addition of said second alkaline agent, the precipitate recovered after the first stage being a crude or fertilizer grade material and the precipitate recovered after the last stage being a pure or feed grade animal supplement.

4. The method of claim 3 in which fluorine and metal impurities are precipitated from said brine in said first stage of precipitaion.

5. The method of claim 4 in which following precipitation and removal of fluorine and metal impurities and the pH of said brine is adjusted to the range of 3.3 to 6.0 to precipitate pure or feed grade dicalcium phosphate.

6. The process of claim 1 in which said second alkaline agent is added in a substantially stoichiometric ratio to the divalent cations in said brine.

7. The method of claim 1 further including the steps of evaporating the remaining liquid from said brine and recovering salt therefrom.

8. The method of claim 1 in which said brine is oil or gas field waste brine.

9. The method of claim 8 including the step of initially removing and recovering oil from said brine.

10. The method of claim 8 including the step of initially filtering said brine to remove suspended solids.

11. The method of claim 1 in which said brine is seawater or the effluent from a seawater desalination plant.

12. The method of claim 1 in which said oxidizing agent is hydrogen peroxide.

13. The method of claim 1 in which step (a) is carried out at an acidic pH.

14. A method for recovering useful products from an oil or gas field waste brine containing divalent ferrous, calcium, and magnesium ions comprising the steps of:

(a) removing any oil from said brine and filtering said brine to remove suspended solids therefrom;

(b) removing iron from said brine by adding a sufficient amount of an oxidizing agent to convert ferrous ions to ferric ions, and precipitating said iron as an iron oxide;

(c) removing magnesium from said brine by adjusting the pH of said brine to the range of 7.5 to 9.0 through the addition of a first alkaline agent comprising sodium hydroxide and precipitating and removing said magnesium as a magnesium hydroxide;

(d) adding sufficient phosphoric acid to said brine to adjust the pH thereof to the range of 0.5 to 1.5, and then adding a first portion of a second alkaline agent comprising sodium hydroxide to precipitate metal impurities and fluorine along with a calcium phosphate precipitate, separating said calcium phosphate precipitate from said brine, adjusting the pH of said brine to the range of 3.3 to 6.0 by the addition of a second portion of said second alkaline agent to form a dicalcium phosphate precipitate.

(e) separating said dicalcium phosphate precipitate from said brine; and (f) recovering salt from said brine by evaporating the remaining liquid therefrom.

* * * * *